United States Patent [19]
Guillot

[11] Patent Number: 5,399,599
[45] Date of Patent: Mar. 21, 1995

[54] THERMOPLASTIC ELASTOMERIC INTERNAL INSULATION FOR ROCKET MOTORS FOR LOW TEMPERATURE APPLICATIONS

[75] Inventor: David G. Guillot, Tremonton, Utah

[73] Assignee: Thiokol Corporation, Ogden, Utah

[21] Appl. No.: 39,044

[22] Filed: Apr. 6, 1993

[51] Int. Cl.⁶ .......................... C08J 3/20; C08K 5/49; C08L 77/00
[52] U.S. Cl. ................... 524/115; 428/474.4; 524/121; 524/123; 524/124; 524/127; 524/130; 524/136; 524/140; 524/145; 524/386; 524/387; 524/414; 524/415; 524/416
[58] Field of Search ............... 428/474.4; 524/115, 524/121, 123, 124, 127, 130, 136, 140, 145, 414, 415, 416, 386, 387

[56] References Cited

U.S. PATENT DOCUMENTS

| | | | |
|---|---|---|---|
| 3,472,812 | 10/1969 | Byrne et al. | 260/41.5 |
| 3,506,607 | 4/1970 | Bobear | 260/37 |
| 3,666,707 | 5/1972 | Livingston | 260/33.2 |
| 3,723,481 | 3/1973 | Bobear | 260/37 SB |
| 3,755,223 | 8/1973 | Engel | 260/18 PN |
| 4,205,035 | 5/1980 | Kröger et al. | 264/120 |
| 4,492,779 | 1/1985 | Junior et al. | 523/138 |
| 4,786,673 | 11/1988 | Morival et al. | 524/101 |
| 4,871,795 | 10/1989 | Pawar | 524/267 |
| 4,878,431 | 11/1989 | Herring | 102/290 |

OTHER PUBLICATIONS

J. R. Flesher, "Polyether block amide: high-performance TPE," *Modern Plastics*, Sep. 1987.

*Primary Examiner*—Paul R. Michl
*Assistant Examiner*—P. Niland
*Attorney, Agent, or Firm*—Madson & Metcalf; Ronald L. Lyons

[57] ABSTRACT

Thermoplastic elastomeric ablative insulation having good mechanical properties at extremely low temperatures are disclosed. The insulation is based upon a polyamide-ether resin and includes carefully selected fillers to possess good low temperature mechanical properties and still provide suitable charring and ablative insulation performance at low temperatures ($-65°$ F.). A typical insulation within the scope of the present invention includes a polyamide-ether thermoplastic elastomeric polymer resin, an inorganic phosphorus containing compound, such as ammonium polyphosphate, present in the insulation from about 5 to about 60 phr, and a polyhydric alcohol present, such as pentaerythritol, in the insulation from about 1 to about 30 phr. The insulation compositions within the scope of the present invention optionally include silicone resin present in the insulation in range from about 0 to 15 phr. Chopped fiber filler may also be present in the insulation in range from about 0 to 100 phr.

12 Claims, No Drawings

THERMOPLASTIC ELASTOMERIC INTERNAL INSULATION FOR ROCKET MOTORS FOR LOW TEMPERATURE APPLICATIONS

BACKGROUND OF THE INVENTION

1. Field of the Invention

The invention relates to ablative insulation, particularly insulation to protect the interior of a rocket motor from the combustion products of burning propellant. More particularly, the present invention relates to thermoplastic elastomeric ablative insulation which retains good mechanical properties at low temperature.

2. Technology Review

The combustion of a propellant in a rocket motor creates a hostile environment characterized by extremely high temperature, pressure, and turbulence. The combustion temperature within the motor often exceeds 6,000° F., and the pressure within the motor frequently exceeds 1,000 psi. Gas velocities typically range from Mach 0.2 in the inlet region to Mach 10+ at the aft end of the rocket motor nozzle. This environment is particularly hostile in a solid rocket motor because its combustion gas contains chemical species and particulates which tend to physically and chemically erode exposed rocket motor nozzle components. While the combustion of a rocket propellant is usually brief, the conditions described above can destroy insufficiently protected or inferior rocket motor parts prematurely and jeopardize the mission of the motor.

Parts of a rocket which are exposed to the high temperatures, pressures, and erosive flow conditions generated by the burning propellant must be protected by a layer of insulation. Various materials have been tried as insulation, such as silica dioxide, glass, or carbon fiber reinforced silicone and/or polyisoprene elastomers, but reinforced resin composite materials are most commonly used. These include phenolic resins, epoxy resins, high temperature melamine-formaldehyde coatings, ceramics, polyester resins and the like. These materials, when cured, usually become rigid structures which crack or blister when exposed to the rapid temperature and pressure changes occurring when the propellant is burned.

The best rocket insulation materials previously known to the art are elastomeric polymers reinforced with asbestos, polybenzimidazole fiber, or polyaramid fiber. These compositions are ablative insulation because they are partially consumed during combustion, but nevertheless they provide protection for the rocket motor. Such materials are capable of enduring in a rocket motor long enough to allow complete combustion of the propellant. Asbestos-reinforced elastomeric insulation is the subject of U.S. Pat. No. 3,421,970, to Daley et al., issued Jan. 14, 1969, and U.S. Pat. No. 3,347,047, to Hartz et al., issued Oct. 17, 1967.

Environmental and health concerns have led manufacturers to seek an acceptable replacement for the asbestos in rocket motor case insulation. One alternative elastomeric insulation contains aramid polymer fibers in combination with a powder filler. That insulation is disclosed in U.S. Pat. No. 4,492,779, assigned to Morton Thiokol, Inc., now known as Thiokol Corporation. A third alternative is elastomeric insulation which contains polybenzimidazole polymer fibers in combination with a powder filler. That insulation is disclosed in U.S. Pat. No. 4,600,372, also assigned to Morton Thiokol, Inc. (See also U.S. Pat. No. 4,507,1665.)

Another problem with existing rocket motor insulation is the expense and difficulty of fabricating an insulator and installing it, either as one piece or in sections, within a rocket motor casing. The problems of fabricating thermosetting resinous insulation which is not capable of being cast are described in U.S. Pat. No. 3,177,175, issued to Barry, Jr., on Apr. 6, 1965. While uncured thermosettable resins and elastomers can be formed under heat and pressure in a matched metal die mold, they can only be formed before they cure to a thermoset condition. Typically, both heat and pressure must be exerted during the curing reaction to fuse overlapped segments of insulation into a smooth-surfaced, integral layer. For larger solid rocket motors, precured elastomeric material is often used as insulation. This cured material is laid up and joined within a rocket motor casing with an adhesive to fabricate an insulation member. It is then necessary to machine the insulation to provide a smooth surface which does not have overlapped sections. A further disadvantage of using curable resinous or elastomeric insulation is the time required to cure the insulation sufficiently—between several hours and several days.

To alleviate some of the problems of handling thermosetting materials, insulation consisting of filled polyolefins such as polyethylene or polypropylene has been proposed. Besides the obvious fabrication economies of working with thermoplastic insulation, the prior art has recognized the theoretical superiority of thermoplastic resins for ablative insulation because they undergo endothermic pyrolysis, carrying heat away from the insulation. Thermoplastic resins also have high specific heats, and their pyrolysis products have high specific heats and low molecular weights. The theoretical superiority of thermoplastic resins is recognized in U.S. Pat. No. 3,395,035, issued to Strauss on Jul. 30, 1968 (column 6, lines 39–53); and U.S. Pat. No. 3,397,168, issued to Kramer et al., on Aug. 13, 1968 (column 2, lines 15–19; column 3, lines 4–5).

Thermoplastic resin-based material readily melts and flows when subjected to heat. (See the Kramer et al. patent previously cited, column 1, line 64 to column 2, line 4.) Therefore, the art teaches that thermoplastic resins used in ablative insulation must be combined with thermosetting resins and impregnated into a refractory or fiber matrix to prevent the insulation from melting and running off when exposed to the extreme heat and erosion of a rocket motor.

The previously cited Strauss patent, particularly at column 2, lines 55–60, described resin-impregnated open-celled porous ceramic material as such a matrix. While Strauss contemplates the use of the thermoplastic materials as the impregnant, most of the resins actually listed are thermosetting, and the reference indicates at column 6, lines 28–38 that thermosetting resins are preferred. Kramer et al. says that thermoplastic resins impregnated in the ceramic matrix cause the ceramic to crack under thermal shock. Column 6, lines 63–66, of Kramer et al. suggests that the cracking problem can be alleviated by impregnating the ceramic matrix with a thermosetting resin before impregnating it with a thermoplastic resin. This minimizes the amount of thermoplastic resin actually present in the insulation, and does not avoid the fabrication problems of thermosetting insulation because the ceramic matrix itself is not thermoplastic. It must be molded (and cured) or machined into the necessary configuration. The working examples of Kramer, et al. do not use any thermoplastic resin.

Another approach is found in U.S. Pat. No. 3,314,915 issued to Baughman, et al., on Apr. 18, 1967. Here, a composite of asbestos and nylon fiber is impregnated with a thermoplastic binder, after which the material is further impregnated with a much larger amount of thermosetting resin (see column 2, lines 45-68). Thus, the insulation contains predominantly thermosetting resin as opposed to thermoplastic resin.

The Kramer et al. patent previously discussed briefly refers to a thermoplastic resin composition not protected by a refractory matrix. In column 3, lines 39 to the end, Kramer demonstrates that polyethylene filled with silica can be melt cast, but cannot even briefly withstand an assault with an oxyacetylene torch.

Several references disclose insulation which is thermoplastic before being cured, but which is cured to form a thermosetting product. (Such materials are distinguished herein from true thermoplastic materials which can be subjected to heat and pressure without curing and thus losing their thermoplastic properties.) For example, in U.S. Pat. No. 3,472,812 issued to Byrne, et al. on Oct. 14, 1969, thermoplastic polymers are suggested, but the insulation appears to be cross-linked before being installed. U.S. Pat. No. 3,459,701 issued to Chandler, et al. on Aug. 5, 1969, discloses copolymerization of a polyamide resin and epoxy resin to form a reinforced composite for protecting rocket motor launch structures from high temperature and gas flow rates. The reference suggests at column 4, lines 69-75, that the two parts of the composition be packed separately and mixed just before use, suggesting a thermosetting material which cures when the two portions are mixed. U.S. Pat. No. 3,562,304, issued to Tucker, Feb. 9, 1971, indicates that a synthetic rubber based insulation can be extruded or formed as sheets (which is true of rubber compositions generally, even though they are thermosetting after being cured under heat and pressure). See also U.S. Pat. No. 4,596,619, issued to Marks on Jun. 24, 1986. This patent teaches that heat and pressure must be applied to the insulation after it is laid up to cure it and fuse the overlapped edges of insulation into an integral, smooth-surfaced member. Also, the tacky ribbon of material must be carefully handled to avoid contamination with dust, can only remain tacky for a relatively short time, and cannot be returned to a tacky state once it begins to cure. The material must be formed, extruded, and applied very promptly to successfully use this technique.

A serious concern for rocket motors, such as tactical motors, which must be able to operate in extremely cold temperatures, as low as −65° F., is the possession of good strain capability. Insulation, whether thermosetting or thermoplastic, often becomes brittle and cracks at extremely cold temperatures. Under such conditions, the rocket motor may fail and break apart.

It would be a significant advancement in the art to provide thermoplastic elastomeric ablative insulation materials having good processing characteristics, which also possess good mechanical characteristics at extremely cold temperatures.

Such thermoplastic elastomeric ablative insulation materials for low temperature application are disclosed and claimed herein.

SUMMARY OF THE INVENTION

The invention is directed to thermoplastic elastomeric ablative insulation having good mechanical properties at extremely low temperatures, such as −65° F. The insulation is based upon a polyamide-ether resin and includes carefully selected fillers to possess good low temperature mechanical properties and still provide suitable charring and ablative insulation performance at low temperatures.

A typical insulation within the scope of the present invention includes a polyamide-ether thermoplastic elastomeric polymer resin, a phosphorus containing compound present in the insulation from about 5 to about 60 phr, and a polyhydric alcohol present in the insulation from about 1 to about 30 phr. The term "phr" means "parts per hundred parts resin by weight." The insulation compositions within the scope of the present invention optionally include silicone resin present in the insulation in range from about 0 to 15 phr, hydroxy terminated polybutadiene in the range from about 0 to 15 phr, or an antioxidant present in amounts less than 2 phr. Chopped fiber filler may also be present in the insulation in range from about 0 to 100 phr.

Several advantages of the thermoplastic insulation and method described herein are that the material can be made up in advance and remelted in bulk, it can be heat sealed or otherwise reformed after it is fabricated, and it does not require curing. These advantages can be achieved without sacrificing the ablative performance of vulcanized or other thermosetting insulation.

DETAILED DESCRIPTION OF THE INVENTION

The present invention is directed to thermoplastic elastomeric ablative insulation having good mechanical properties at extremely low temperatures. A polyamide-ether resin is combined with carefully selected fillers to produce an insulation possessing good low temperature mechanical properties while providing suitable charring and ablative insulation performance at such low temperatures (−65° F.).

The ablative insulations within the scope of the present invention include the following ingredients:

| Ingredient | phr |
| --- | --- |
| polyamide-ether thermoplastic elastomeric resin | 100 |
| phosphorus compound | 5-60 |
| polyhydric alcohol | 1-30 |
| silicone resin | 0-15 |
| chopped fiber filler | 0-100 |
| antioxidant | 0-2 |
| HTPB | 0-15 |

Examples of preferred thermoplastic elastomeric polymeric resins include block copolymers of polyamides and polyethers. A range of such materials is sold under the trademark PEBAX ® by Atochem, Inc., Birdsboro, Pennsylvania. Two currently preferred thermoplastic elastomeric polymeric resins are PEBAX ® 2533 and PEBAX ® 3533. The first two digits of the number indicate the Shore D hardness (25 or 35) and the last two digits represent the series or chemical family (33 indicates an extrusion and molding grade polymer having a density of about 1.01 gm/cc). Soft polyamide and polyether copolymer resins, having a softness comparable to rubber, are preferred.

The phosphorus containing compound is more preferably in the range from about 20 to about 30 phr. Preferred phosphorus containing compounds which may be used in the present invention include phosphates, phosphosines, and elemental (red) phosphorous. Ammonium polyphosphates are particularly preferred phosphorus containing compounds. One currently preferred ammonium polyphosphate is sold under the trademark Phos-Chek® by Monsanto, Saint Louis, Mo., having the general formula $(NH_4)_{n+2}P_nO_{3n+1}$ where n is from 1000 to 3000. Another ammonium polyphosphate is sold under the trademark EXOLIT® by Hoechst Celanese, Charlotte, N.C. Another phosphorus containing compound within the scope of the present invention is melamine amylphosphate.

The polyhydric alcohol is more preferably present in the ablative insulation from about 5 to about 10 phr. Typical polyhydric alcohols for use in the present invention are acyclic and cyclic compounds having a plurality of hydroxyl groups attached thereto such as pentaerythritol, dipentaerythritol, and tripentaerythritol. It is believed that the polyhydric alcohol acts as an additional carbon source to increase the amount of char formation.

The insulation materials of the present invention optionally include silicone resin ranging up to about 15 phr. One currently preferred silicone resin is sold by GE Silicons, Waterford, N.Y. under the tradename, SFR-100. It is particularly adapted for heat resistant applications. It had a viscosity in the range from 200,000 cps to 900,000 cps at 25° C. Other similar silicone resins may also be used.

The chopped fiber filler more preferably ranges from about 1 to about 20 phr in the ablative insulation. Currently preferred examples of chopped fibers which may be used within the scope of the present invention include chopped polybenzimidazole ("PBI") fiber, chopped aramid polymer fibers such as Kevlar®, Kevlar®29, and Kevlar®49, and Nomex® sold by DuPont, and ceramic fibers such as Nextel® fibers sold by 3M. The chopped fibers are preferably small, about ⅛ inch.

The thermoplastic ablative insulation within the scope of the present invention optionally includes an antioxidant, such as those commonly used in with thermoplastic resins. Currently preferred antioxidants include phenolics, such as the hindered phenol tetrakis(-methylene(3,5-di-tert-butyl-4-hydroxyhydrocinnamate))methane, sold by Ciba-Geigy under the tradename Irganox® 1010; phosphites, such as 2,2'-ethylidene-bis(4,6-di-tert-butylphenyl)fluorophosphite, sold by Ethyl Corporation under the tradename Ethanox® 398 or bis(2,4-di-tert-butylphenyl)pentaerythritoldiphosphite, sold by GE Specialty Chemicals under the tradename Ultranox® 627A; and amine-type antioxidants, such as polymerized 1,2-dihydro-2,2,4-trimethylquinone, sold by R. T. Vanderbilt under the tradename Agerite® Resin D. An additional benefit from using a phosphite antioxidant is that it provides a source of phosphorus. Thus, some of the phosphorus compound may be replaced by a phosphite antioxidant.

The insulation compositions within the scope of the present invention optionally include a butadiene polymer, such as hydroxy terminated polybutadiene (HTPB). When used, the HTPB is preferably used in amounts in the range from about 3 phr to about 15 phr.

A small amount of peroxide, less than 1 phr, may be added to the insulation materials of the present invention to partially cross-link or harden the butadiene to improve bonding or adherence to the fiber.

Importantly, the thermoplastic insulation materials described herein may be shaped or molded as desired and used without the typical curing required in the prior art. In addition, the ablative insulations of the present invention can be prepared in advance and remelted in bulk. They can also be heat sealed or otherwise reformed after fabrication. These advantages can be achieved without sacrificing the ablative performance of vulcanized or other thermosetting insulation.

The following examples are offered to further illustrate the present invention. These examples are intended to be purely exemplary and should not be viewed as a limitation on any claimed embodiment.

EXAMPLE 1

A thermoplastic elastomeric ablative insulation was prepared having the following ingredients:

| Ingredient | phr |
| --- | --- |
| Pebax® 2533 | 100 |
| Ammonium Polyphosphate | 23.8 |
| Pentaerythritol | 6.16 |
| Silicone resin, SFR-100 | 6.84 |
| PBI chopped fiber, ⅛ inch | 7.2 |

The PEBAX® 2533, a block copolymer of polyamides and polyethers, was obtained from Atochem Inc. The silicone resin, SFR-100, was obtained from GE Silicons, Waterford, N.Y. It had a viscosity in the range from 200,000 cps to 900,000 cps at 25° C. The PBI (polybenzimidazole) chopped fiber was obtained from Celanese, Charlotte, N.C.

The foregoing ingredients where combined by mixing the solid ingredients (ammonium polyphosphate and pentaerythritol) into the PEBAX® polymer. The silicone resin was then added, followed by the chopped fiber. The ingredients were mixed using a conventional mixer and a continuous mixing extruder.

Tensile strength and percent elongation were measured for the ablative insulation at different temperatures. The results are as follows:

| | Mechanical Properties | | |
| --- | --- | --- | --- |
| | 70° F. | −35° F. | −65° F. |
| Tensile Strength Parallel | 1113 psi | 2287 psi | 4135 psi |
| Elongation at Failure Parallel | 35% | 38% | 20% |

The performance of this insulation material was examined in a charmotor study and found to be comparable to the known TPE insulation material TIR-701 (polyisoprene and Kevlar®) obtained from Kirkhill Rubber Company.

EXAMPLE 2

A thermoplastic elastomeric ablative insulation was prepared having the following ingredients:

| Ingredient | phr |
| --- | --- |
| Pebax® 2533 | 100 |
| Phos-Chek® P-40 | 23.8 |
| Diene 35NF | 2.3 |
| HTPB R45M | 4.6 |

-continued

| Ingredient | phr |
|---|---|
| Agerite ® Resin D | 0.1 |
| Pentaerythritol | 6.2 |
| PBI chopped fiber, ⅛ inch | 7.2 |
| Lupersol ® 231 | 0.4 |

The Pebax ® 2533, a block copolymer of polyamides and polyethers, was obtained from Atochem Inc. The Phos-Chek ®P-40, ammonium polyphosphate, was obtained form Monsanto, Saint Louis, Mo. The Diene 35NF is a stereospecific polybutadiene rubber obtained from Firestone. HTPB R45M is hydroxy terminated polybutadiene having about 2.3 functional groups per molecule. Agerite ® Resin D is an amine-type antioxidant comprising polymerized 1,2-dihydro-2,2,4-trimethylquinone obtained from R. T. Vanderbilt. Lupersol ® 231 is a peroxide comprising 1,1-bis(tert-butyl peroxide) 3,3,5-trimethylcyclo hexane obtained from ELF Atochem. The PBI (polybenzimidazole) chopped fiber was obtained from Celanese, Charlotte, N.C.

The foregoing ingredients where combined as follows: A master batch was made by blending the pentaerythritol and PBI fiber in a blender. The Diene 35NF polymer and the HTBP R45M plasticizer and Agerite antioxidant were then mixed with the PBI/pentaerythritol on a mill. The Lupersol ® peroxide was added last. After the ingredients were well dispersed, the master batch was heated in an oven at 150° F. The Pebax ® 2533 and Phos-Chek ® P-40 were mixed together and the master batch was added. The final insulation was molded at 360° F.

Tensile strength and percent elongation were measured for the ablative insulation at different temperatures. The results are as follows:

| Mechanical Properties | 72° F. | −65° F. |
|---|---|---|
| Tensile Strength Parallel | 1083 psi | 3479 psi |
| Elongation at Failure Parallel | 584% | 51.4% |

EXAMPLE 3

A thermoplastic elastomeric ablative insulation was prepared having the following ingredients:

| Ingredient | phr |
|---|---|
| Pebax ® 2533 | 100 |
| Phos-Chek ® P-40 | 23.8 |
| Diene 35NF | 2.3 |
| HTPB R45M | 4.6 |
| Agerite ® Resin D | 0.1 |
| Pentaerythritol | 6.2 |
| PBI chopped fiber, ⅛ inch | 12.0 |
| Lupersol ® 231 | 0.4 |

A master batch was made by blending all of the ingredients together except the Pebax ® 2533 and the Phos-Chek ® P-40 on a mill for about 20 minutes. The master batch was heated in an oven at 150° F. to react part of the peroxide. It was then mixed with the remainder of the ingredients in an internal mixer.

Tensile strength and percent elongation were measured for the ablative insulation at different temperatures. The results are as follows:

| Mechanical Properties | 72° F. | −65° F. |
|---|---|---|
| Tensile Strength Parallel | 927 psi | 3830 psi |
| Perpendicular | 938 psi | 3548 psi |
| Elongation at Failure Parallel | 133% | 22.5% |
| Perpendicular | 611% | 38.7% |

EXAMPLE 4

A thermoplastic elastomeric ablative insulation was prepared having the following ingredients:

| Ingredient | phr |
|---|---|
| Pebax ® 2533 | 100 |
| Phos-Chek ® P-40 | 23.8 |
| Diene 35NF | 2.3 |
| HTPB R45M | 4.6 |
| Agerite ® Resin D | 0.1 |
| Pentaerythritol | 6.2 |
| PBI chopped fiber, ⅛ inch | 12.0 |

The foregoing ingredients, except PBI fiber, were blended together in an internal mixer for about 15 minutes. The PBI fiber was then added to the composition.

Tensile strength and percent elongation were measured for the ablative insulation at different temperatures. The results are as follows:

| Mechanical Properties | 72° F. | −65° F. |
|---|---|---|
| Tensile Strength Parallel | 1345 psi | 4901 psi |
| Perpendicular | 904 psi | 3940 psi |
| Elongation at Failure Parallel | 16.3% | 10.5% |
| Perpendicular | 47.2% | 14.7% |

From the forgoing it will be appreciated that the present invention provides thermoplastic elastomeric ablative insulation materials having good processing characteristics, which also possess good mechanical characteristics at extremely cold temperatures.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A thermoplastic elastomeric ablative rocket motor insulation having good mechanical properties at low temperature comprising:

a polyamide-ether thermoplastic elastomeric polymer resin;

a phosphorus-containing compound selected from phosphates, phosphosines, phosphites, elemental (red) phosphorous, and mixtures thereof present in the insulation from 20 to 30 phr;

a lower molecular weight polyhydric alcohol present in the insulation from 5 to 10 phr, said polyhydric alcohol having at least 3 hydroxyl groups per molecule; and chopped fiber filler present in the insulation in range from about 1 to 100 phr;

wherein the rocket motor insulation is ablative.

2. A thermoplastic elastomeric ablative insulation as defined in claim 1, wherein the phosphorus-containing compound is ammonium polyphosphate.

3. A thermoplastic elastomeric ablative insulation as defined in claim 1, wherein the polyhydric alcohol is pentaerythritol, dipentaerythritol, or tripentaerythritol.

4. A thermoplastic elastomeric ablative insulation as defined in claim 1, further comprising a silicone resin present in the insulation in range from about 0 to 15 phr.

5. A thermoplastic elastomeric ablative insulation as defined in claim 1, further comprising chopped fiber filler present in the insulation in range from about 1 to 20 phr.

6. A thermoplastic elastomeric ablative insulation as defined in claim 1, wherein the chopped fiber filler comprises ⅛ inch chopped polybenzimidazole fiber.

7. A thermoplastic elastomeric ablative insulation as defined in claim 1, wherein the chopped fiber filler is an aramid polymer fiber.

8. A thermoplastic elastomeric ablative insulation as defined in claim 1, wherein the chopped fiber filler is a ceramic fiber.

9. A thermoplastic elastomeric ablative insulation as defined in claim 1, further comprising an antioxidant present in the insulation up to about 2 phr.

10. A thermoplastic elastomeric ablative insulation having good mechanical properties at low temperature comprising:

a polyamide-ether thermoplastic elastomeric polymer resin;

ammonium polyphosphate present in the insulation from 20 to 25 phr;

a polyhydric alcohol selected from pentaerythritol, dipentaerythritol, and tripentaerythritol, said polyhydric alcohol being present in the insulation from 5 to 10 phr;

chopped fiber filler present in the insulation in range from 1 to 20 phr; and an antioxidant present in the insulation in range from 0 to 2 phr;

wherein the rocket motor insulation is ablative.

11. A thermoplastic elastomeric ablative insulation as defined in claim 10, further comprising hydroxy terminated polybutadiene present in the range from about 2 to about 10 phr.

12. A thermoplastic elastomeric ablative insulation as defined in claim 10, further comprising silicone resin present in the range from about 0 to about 15 phr.

* * * * *